(12) United States Patent
Qu et al.

(10) Patent No.: US 10,067,504 B1
(45) Date of Patent: Sep. 4, 2018

(54) AERIAL DEVICE AND METHOD FOR CONTROLLING THE AERIAL DEVICE

(71) Applicant: Hangzhou Zero Zero Technology Co., Ltd., HangZhou, Zhejiang (CN)

(72) Inventors: Zheng Qu, Zhejiang (CN); Pengxiang Jin, Zhejiang (CN); Tong Zhang, Zhejiang (CN)

(73) Assignee: Hangzhou Zero Zero Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 15/893,991

(22) Filed: Feb. 12, 2018

Related U.S. Application Data

(60) Provisional application No. 62/458,903, filed on Feb. 14, 2017.

(51) Int. Cl.
  *G05D 1/00* (2006.01)
  *G05D 1/02* (2006.01)
  (Continued)

(52) U.S. Cl.
  CPC ........... *G05D 1/005* (2013.01); *B64C 39/024* (2013.01); *G05D 1/0061* (2013.01);
  (Continued)

(58) Field of Classification Search
  CPC .... G05D 1/005; G05D 1/0061; G05D 1/0202; B64C 39/024; B64C 2201/108;
  (Continued)

(56) References Cited

U.S. PATENT DOCUMENTS 7,885,732 B2 * 2/2011 Troy ................... G05D 1/0027
                                                345/156
8,588,972 B2 * 11/2013 Fung ...................... B25J 11/003
                                                446/454
(Continued)

FOREIGN PATENT DOCUMENTS

CN    104597108 A    5/2015
CN    105700541 A    6/2016
(Continued)

OTHER PUBLICATIONS

International Search Report and Written Opinion (International Application No. PCT/IB2018/050854); dated Jun. 7, 2018.

*Primary Examiner* — Nicholas Kiswanto
(74) *Attorney, Agent, or Firm* — Howard & Howard Attorneys PLLC

(57) ABSTRACT

An aerial device includes a body, an optical system having gimbal supporting a camera, a lift mechanism coupled to the body, a haptic sensor coupled to the body and configured to generate haptic data, and a processing system disposed in the body and in data communication with the haptic sensor. The processing system is configured to process the haptic data to understand an intended position of the aerial device and/or an intended orientation of the gimbal and convert the intended position to a target position of the aerial device and/or the intended orientation to a target orientation of the gimbal utilizing said processed data irrespective of an initial position of said aerial device and an initial orientation of said gimbal. Also disclosed is a method for controlling the aerial device.

20 Claims, 10 Drawing Sheets

(51) Int. Cl.
*G06F 3/01* (2006.01)
*B64C 39/02* (2006.01)
*G06F 3/0488* (2013.01)

(52) U.S. Cl.
CPC ........... *G05D 1/0202* (2013.01); *G06F 3/016* (2013.01); *G06F 3/04883* (2013.01); *B64C 2201/108* (2013.01); *B64C 2201/127* (2013.01); *B64C 2201/146* (2013.01); *G06F 2203/04808* (2013.01)

(58) Field of Classification Search
CPC ......... B64C 2201/127; B64C 2201/146; G06F 3/016; G06F 3/04883; G06F 2203/04808
See application file for complete search history.

(56) References Cited

U.S. PATENT DOCUMENTS

| | | | |
|---|---|---|---|
| 9,518,821 B2 * | 12/2016 | Malay | G01C 9/005 |
| 9,927,682 B2 * | 3/2018 | Fisher | G03B 15/006 |
| 2017/0277176 A1 * | 9/2017 | Hutson | G05D 1/0016 |
| 2018/0059665 A1 * | 3/2018 | Shin | B64C 39/024 |
| 2018/0095459 A1 * | 4/2018 | Bachrach | G05D 1/0094 |
| 2018/0112980 A1 * | 4/2018 | Diem | G01C 17/38 |

FOREIGN PATENT DOCUMENTS

| | | |
|---|---|---|
| CN | 105700812 A | 6/2016 |
| CN | 105739533 A | 7/2016 |
| CN | 106125924 A | 11/2016 |
| KR | 20160129716 A | 11/2016 |

\* cited by examiner

_US 10,067,504 B1_

AERIAL DEVICE AND METHOD FOR CONTROLLING THE AERIAL DEVICE

CROSS REFERENCE TO RELATED APPLICATIONS

The subject application claims priority to and all the benefits of U.S. Provisional Application No. 62/458,903, filed on Feb. 14, 2017, the contents of which are incorporated herein by reference in their entirety.

FIELD OF THE DISCLOSURE

The subject application relates generally to an aerial device and to a method for controlling an aerial device.

BACKGROUND

Unmanned aerial devices are aerial devices, aerial vehicles, or drones without a human operator or pilot aboard. Such aerial devices have multiple degrees of freedom, including translational motion (such as longitudinal, lateral, and vertical) and rotational motion (such as pitch, roll, and yaw). Translational motion typically changes the position of the aerial device, and rotational motion typically changes the orientation of a multi-degree gimbal carried by the aerial device. For aerial devices lifted or propelled using four rotors, which are often referred to as quadrotors, two rotational motions are coupled with two translational motions (such as pitch-longitudinal motion, roll-lateral motion, etc.). This results in a total of four degrees of freedom, such as pitch-longitudinal, roll-lateral, vertical, and yaw.

The position of the aerial device and/or the orientation of gimbal is typically controlled remotely, such as with a remote controller, a mobile computing device, a smartphone, a tablet computer, and/or other suitable hand-held device. The hand-held device has a plurality of buttons that, when actuated, controls the movement of the aerial device. For example, the remote device may have a control interface including two directional buttons (such as positive and negative buttons) for each of the four degree of freedom movements, amounting to eight total directional buttons. In addition, for aerial devices having an onboard optical system including a camera mounted on the multi-degree gimbal, the control interface may include additional buttons for controlling the orientation of the camera. With this configuration, an operator is often faced with the challenge of learning all of the buttons on the control interface and with having to actuate multiple buttons at the same time to control the position of the aerial device and/or the orientation of the gimbal.

This disclosure is aimed at solving the problems identified above.

SUMMARY

An aerial device is disclosed. The aerial device comprises a body, a lift mechanism coupled to the body and configured to provide at least one of lift and thrust to the body, an optical system coupled to the body and having a camera, a gimbal supporting and enabling rotational movement of the camera, a haptic sensor coupled to the body and configured to generate haptic data, and a processing system disposed in said body and in data communication with said haptic sensor. The processing system is configured to: process said haptic data received from the haptic sensor to understand at least one of an intended position of said aerial device and an intended orientation of said gimbal; and convert said at least one of said intended position of said aerial device and said intended orientation of said gimbal to at least one of a target position of the aerial device and a target orientation of the gimbal utilizing said processed data irrespective of an initial position of said aerial device and an initial orientation of said gimbal.

A method for controlling an aerial device is also disclosed. The aerial device has a body, an optical system coupled to the body and having a camera, a gimbal supporting the camera, a haptic sensor coupled to the body, and a processing system disposed in the body and in data communication with the haptic sensor. The aerial device has an initial position and the gimbal has an initial orientation. The method comprises the steps of: activating the haptic sensor coupled to the body to generate haptic data; processing, by the processing system, the haptic data received from the haptic sensor to understand at least one of an intended position of the aerial device and an intended orientation of the gimbal; converting, by the processing system, the at least one of the intended position of the aerial device and the intended orientation of the gimbal to at least one of a target position of the aerial device and a target orientation of the gimbal utilizing the processed data irrespective of the initial position of the aerial device and the initial orientation of the gimbal; and moving at least one of the aerial device from the initial position to the target position and the gimbal from the initial orientation to the target orientation.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessary drawn to scale. In addition, certain features of the aerial device or system including the aerial device may be represented schematically or semi-schematically.

DETAILED DESCRIPTION

Referring now to the figures, wherein like numerals indicate corresponding parts throughout the several views, embodiments of an aerial device 12 are shown throughout the figures and are described in detail below. The aerial device 12 is an unmanned aerial vehicle (UAV), drone, or other aerial device without a human operator or pilot aboard. The aerial device 12 may be a rotorcraft (such as a quadcopter, a helicopter, and a cyclocopter), a fixed-wing aircraft, an aerostat, or other suitable aircraft or device configured to fly within a physical space. The aerial device 12 may be configured to capture images (such as photographs and/or video), audio, or other data from the physical space. The aerial device 12 may be used for a variety of purposes, such as to perform surveillance for industry, for monitoring weather conditions, for border patrols, for military operations, etc. The aerial device 12 may also be used purely for recreation.

Figure 1:
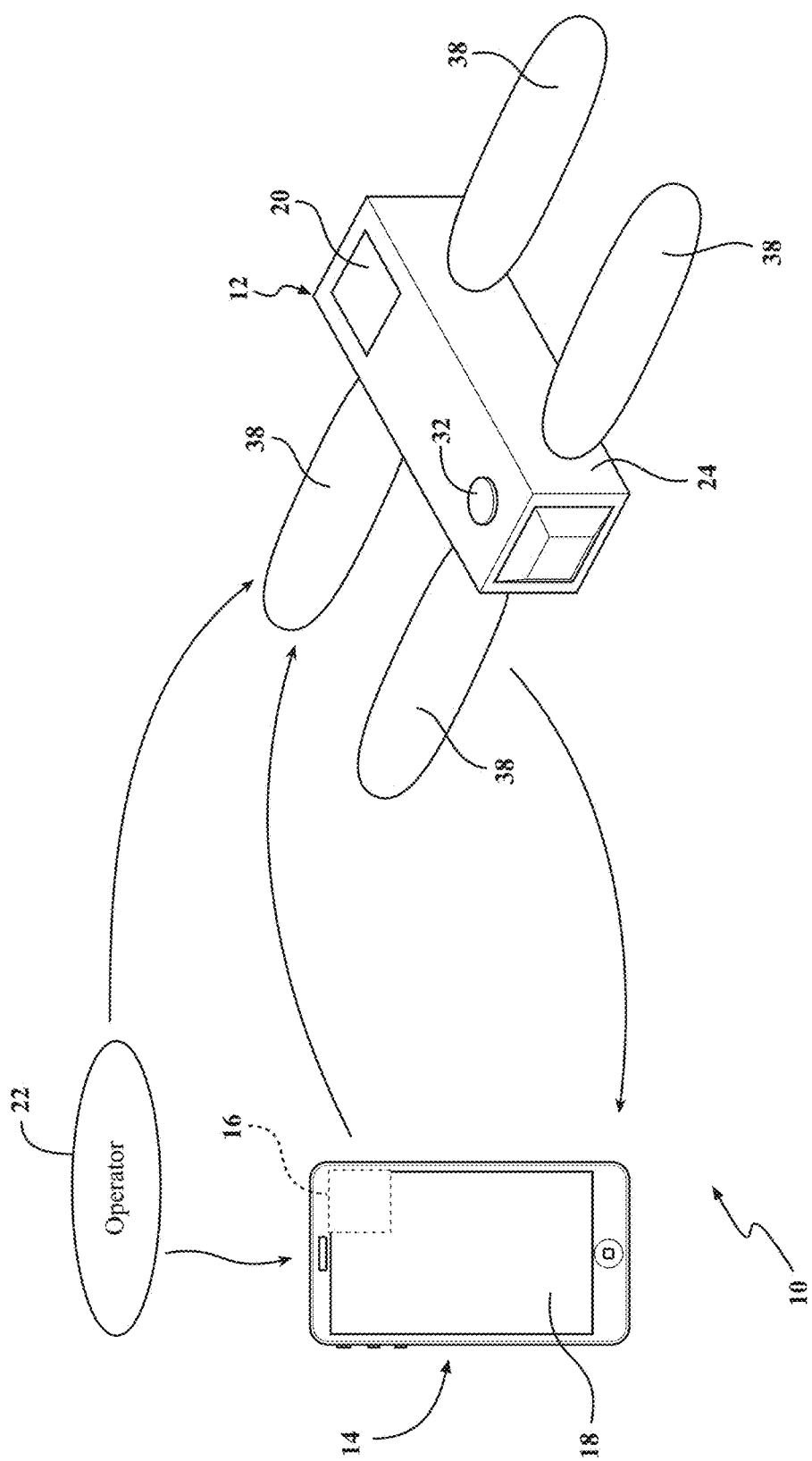
FIG. 1 is a schematic representation of an aerial system including an aerial device according to an embodiment of the present disclosure.

In an embodiment, the aerial device 12 is part of an aerial system 10, as schematically shown in FIG. 1. The aerial system 10 includes the aerial device 12 and a remote device 14 having a control client 16 with a user interface 18 for enabling an operator 22 to control certain operations of the aerial device 12. The control client 16 may be a native application (e.g., a mobile application), a browser application, an operating system application, or other suitable application resident on a processing system of the remote device 14. Other operations of the aerial device 12 may be controlled utilizing a control interface 20 on the aerial device 12 itself. The control interface 20 provides a control platform on the aerial device 12 enabling the operator 22 to control certain or selected operations of the aerial device 12 without direct or physical interaction with the remote device 14. Alternatively, the aerial device 12 could be controlled without using any remote device 14. In this alternative embodiment, all operations of the aerial device 12 could be controlled using the control interface 20 on the aerial device 12 itself. However, in this alternative embodiment, a remote device could be used for receiving data from the aerial device 12, such as images and/or video relayed from the aerial device 12 to the remote device, and not for controlling operations of the aerial device 12.

Embodiments of the aerial device 100 are described in detail below at least with reference to FIGS. 1-5. The aerial device 12 has a body or fuselage 24. The body 24 may be any support structure that suitably protects and/or retains internal components of the aerial device 12, such as a processing system 26, a communication system 28, a power supply 30, etc. which are disposed at least partially inside the body 24. The body 24 may also be any support structure that suitably supports external components of the aerial device 12, such as the control interface 20, haptic sensors 32, a gimbal housing 46, etc. which are mounted to an exterior surface 25 of the body 24. The body 24 may have any suitable configuration, size, and/or geometry. The body 24 may also have a platform and/or other suitable additional support structure for carrying or supporting one or more of the internal components of the aerial device 12. In an embodiment, the body 24 is thermally conductive and functions as an auxiliary heat sink. Additionally, the body 24 may be formed from any suitable material, non-limiting examples of which include carbon fibers, carbon composites, metals, metal alloys, plastics, ceramics, and/or combinations thereof.

In an embodiment, the aerial device 12 further has at least one frame or cage 34 coupled to or disposed at least partially around the body 24. In the embodiment shown in FIG. 3, the aerial device 12 has two frames 34, with one of the frames 34 coupled to one side of the body 24 and another one of the frames 34 coupled to the other side of the body 24. The frame(s) 34 is configured to house rotors 38 of a lift mechanism 36. The frame(s) 34 also functions as an intermediary component between the rotors 38 and some type of retention mechanism, such as the operator's hand, when the device 12 is being held or supported.

The aerial device 12 further has the lift mechanism 36 coupled to the body 24 and configured to provide at least one of lift and thrust to the body 12. In other words, the lift mechanism 36 operates to enable the aerial device 12 to fly. The lift mechanism 36 may also be configured to cool the internal aerial device components (such as the processing system 26, etc.), the interior of the body 24, etc. In an embodiment, the lift mechanism 36 includes at least one rotor 38. In another embodiment, the lift mechanism 36 includes a set of rotors 38 that operate individually or collectively. Each of the rotors 38 may be driven by a motor (such as an electric motor), a jet engine, a propeller, or any other suitable force-generation device or mechanism. The motors are powered by the power supply 30 and are typically controlled by the processing system 26.

Figure 3:
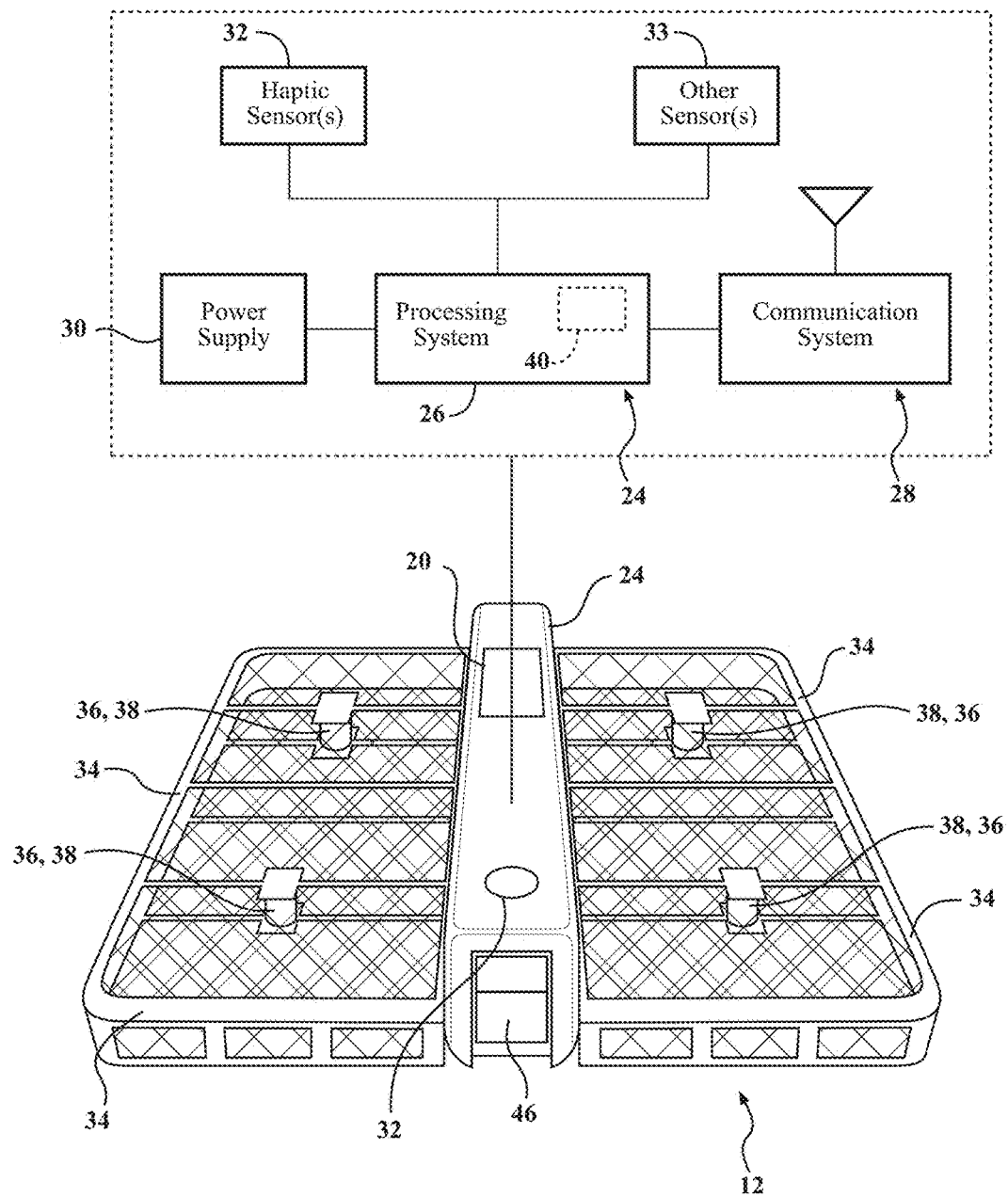
FIG. 3 is a front perspective view of the aerial device including a schematic representation of internal components of the aerial device.

The rotors 38 of the lift mechanism 36 operate individually or collectively to enable aerial device 12 flight. It is to be appreciated that the aerial device 12 could also include any other suitable flight components that operate to enable or assist aerial device 12 flight. In an embodiment, the aerial device 12 has four rotors 38, with each rotor 38 arranged adjacent a respective corner of the body 24. An example of this is shown in FIG. 3. In another embodiment, the rotors 38 may be positioned at any desirable location relative to the body 24. In alternative embodiments, the aerial device 12 could have any number of rotors 38, such as one rotor, two rotors, three rotors, etc.

Figure 2:
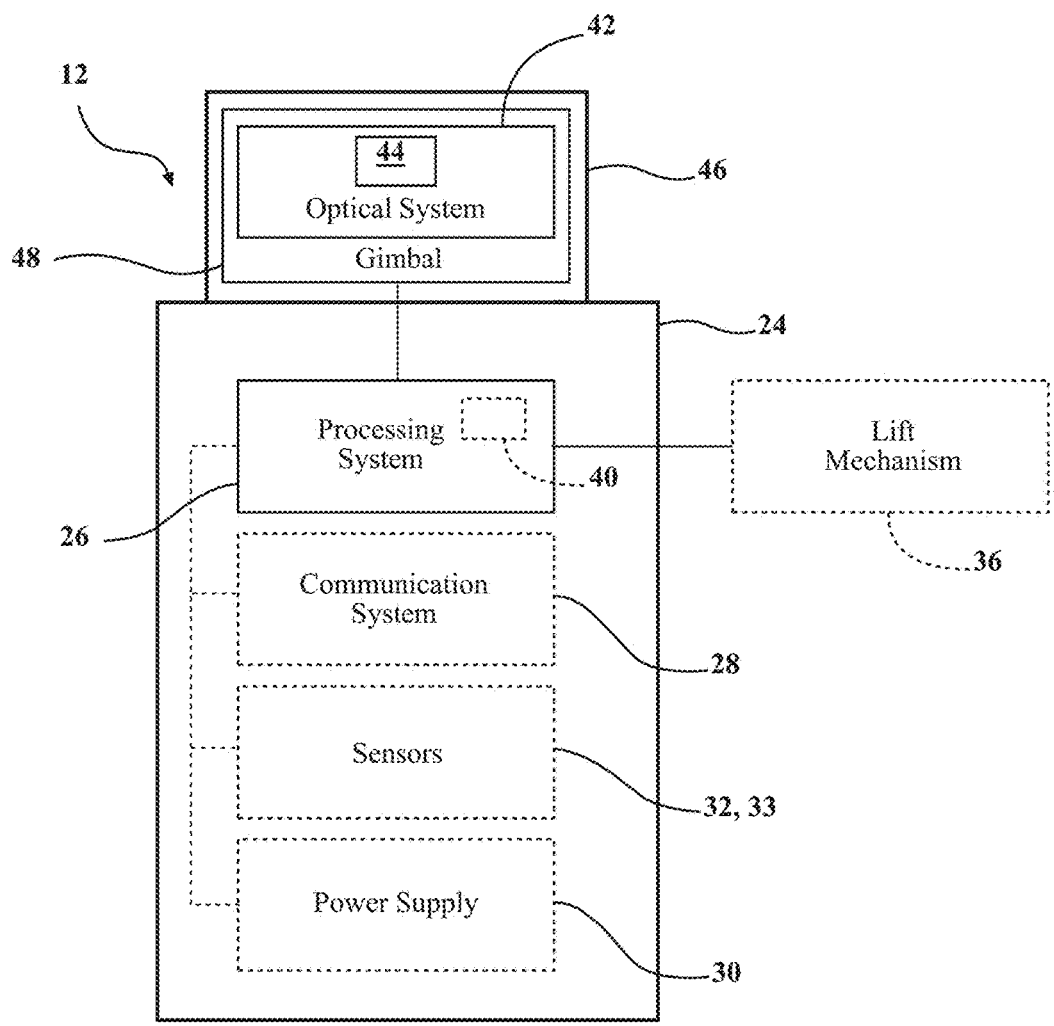
FIG. 2 is a schematic representation of the aerial device according to an embodiment of the present disclosure.

As shown in FIGS. 2 and 3, the processing system 26 is disposed in the body 24 of the aerial device 12 and connected to the active components of the aerial device 12. The processing system 26 includes one or more processors 40 configured to execute one or more software programs for controlling the aerial device 12. In an embodiment, the processing system 26 receives operation instructions (such as from the communication system 28 and/or other active components of the aerial device 12), converts the operation instructions into machine instructions, and controls the aerial device 12 based on the machine instructions (individually or as a set). The processing system 26 may additionally or alternatively process images recorded by an optical system 42 coupled to the body 24, stream images to the remote device 14 in real time or near real time, and/or perform any other suitable functionality.

The processor(s) 40 of the processing system 26 may be a CPU, GPU, and/or the like, and may include a memory (such as a Flash memory, RAM, etc.) and/or any other suitable processing component. In an embodiment, the processing system 26 also includes dedicated hardware that automatically processes images obtained from the optical system 42 (such as de-warping the image, filtering the image, cropping the image, etc.) prior to transmission to the remote device 14. Further details of the optical system 42 are described below.

The communication system 28 is also disposed in the body 24 and operates to send and/or receive information (data) to/from the remote device 14. In an embodiment, the communication system 28 is connected to the processing system 26, such that the communication system 28 sends data to the processing system 26 and/or receives data from the processing system 26. The communication system 28 may be a wired or a wireless communication system. In addition, the communication system 28 may a long-range communication system, a short-range communication system, or any other suitable communication module. Non-limiting examples of suitable communications systems 28 include 802.11x, Wi-Fi, Wi-Max, NFC, RFID, Bluetooth, ZigBee, cellular telecommunications (e.g., 2G, 3G, 4G, LTE, etc.), radio (RF), USB, and/or other suitable communication modules or systems. The communication system 28 also typically shares at least one system protocol (such as BLE, RF, etc.) with the remote device 14. Alternatively, the communication system 28 may communicate with the remote device 14 via an intermediary communication system (such as a protocol translation system).

The aerial device 100 further has the power supply 30 disposed within or mounted to the body 24. The power supply 30 operates to supply power, either directly or indirectly, to all of the active components (such as the lift mechanism 36, the processing system 26, the optical system 42, etc.) of the aerial device 12. The power supply 30 may be mounted within the body 24 and connected to the active components, or may be otherwise arranged. Non-limiting examples of suitable power supplies include rechargeable batteries, primary batteries, secondary batteries, fuel cells, external power supplies (such as a RF charger, induction charger, etc.), an energy harvesting system (such as a solar energy system), and/or the like.

As previously mentioned, the aerial device 12 further includes the optical system 42 coupled to the body 24 and configured to record images of the physical space proximal the aerial device 42. The optical system 42 includes at least one camera 44 and other optical system components for supporting and/or assisting with the functionality of the camera 44. The camera 44 may be a single lens camera (such as a CCD camera, CMOS camera, etc.), a stereo-camera, a hyperspectral camera, a multispectral camera, or any other suitable imaging or optical device or sensor. The optical system 42 may be active (e.g., controlled by the processing system 26) or passive (e.g., controlled by a set of weights, spring elements, magnetic elements, etc.). The optical system 42 may include additional components configured to translate the camera 44 along one or more axes relative to the body 24 and/or to actuate the camera 44.

The aerial device 12 further includes a gimbal 48 supporting the camera 44. The gimbal 48 may be a platform or other support that can pivot to enable rotation of the camera 44 about at least one axis (such a roll, pitch, and yaw). In an embodiment, the gimbal 48 may include an actuator, such as a brushless motor, for actuating movement of the gimbal 48.

In an embodiment, the aerial device 12 further includes the housing 46 for supporting the optical system 42 and the gimbal 48. The housing 46 is coupled to the body 24, and the optical system 42 (which includes the camera 44 and possibly other optical system components) and the gimbal 48 are disposed in the housing 46.

The aerial device 12 further has a self-stabilizing feature or application executable by the processing system 26. Utilizing information obtained from onboard accelerometer(s) and/or gyroscope(s), the self-stabilizing feature instructs certain components of the device 12 to operate in a particular fashion in order to keep the aerial device 12 at a particular position and/or the gimbal 46 at a particular orientation. This is useful, for example, when the device 12 is subjected to an external disturbance, such as wind, etc. In an example, the self-stabilizing feature instructs the rotors 38 to operate in a particular fashion so that the aerial device 12 can go to and stay at a target position and/or the gimbal 48 can rotate to and stay at a target orientation specified by the operator 22.

Figure 4:
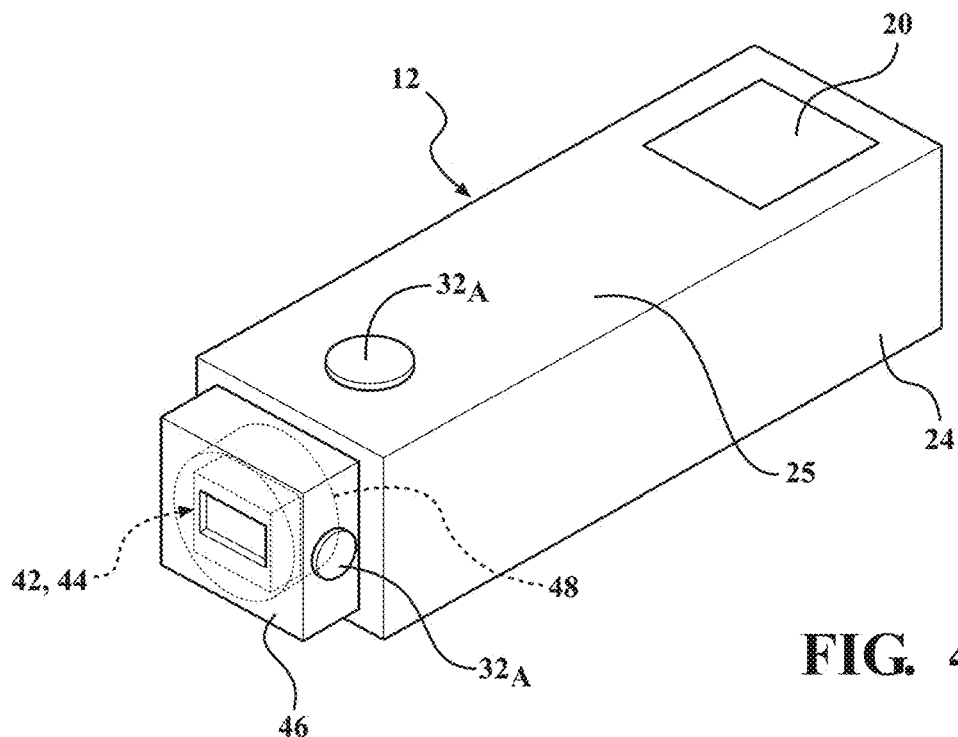
FIG. 4 is a schematic front perspective view of a portion of the aerial device with a plurality of touch sensors according to an embodiment of the present disclosure.
Figure 5:
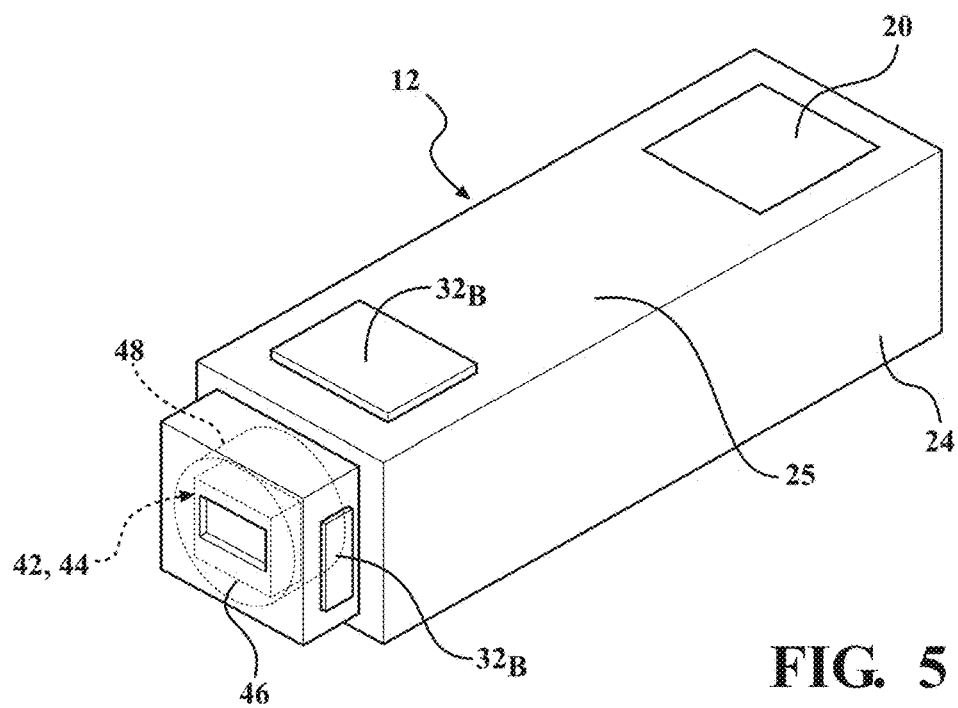
FIG. 5 is a schematic front perspective view of a portion of the aerial device with a plurality of touch screens according to another embodiment of the present disclosure.

As shown at least in FIGS. 4 and 5, the aerial device 12 further includes the haptic sensor(s) 32 coupled to the exterior surface 25 of the body 24. In an embodiment, the aerial device 12 include at least one haptic sensor 32 coupled to the body 24. In another embodiment, the aerial device 12 includes two haptic sensors 32 coupled to the body 24. One of the haptic sensors 32 may be mounted to the body 24 of the aerial device 12, and the other one of the haptic sensors 32 may be mounted to the housing 46 of the optical system 42. The one haptic sensor 32 may be mounted at any desirable location on the body 24, and the other haptic sensor 32 may be mounted at any desirable location on the housing 46. In the embodiment shown in FIGS. 4 and 5, the one haptic sensor 32 is mounted to the top of the body 24, and the other haptic sensor 32 is mounted to a side of the housing 46. It is to be appreciated that the haptic sensors 32 can be located at any desirable location on the body 24 and the housing 46, typically wherever the haptic sensors 32 are most accessible to the operator 22. In addition, the haptic sensors 32 may be mounted to the body 24 and the housing 46 by any suitable means.

The haptic sensors 32 are configured to generate haptic data. As described in further detail below, the haptic data is used by the processing system 26 to understand at least one of an intended position of the aerial device 12 and an intended orientation of the gimbal 48, and to convert the intended position and/or intended orientation into a target position of the aerial device 12 and/or a target orientation of the gimbal 48. The processing system 26 performs the converting step irrespective of the initial position of the aerial device 12 and the initial orientation of the gimbal 48.

The haptic sensor 32 is selected from a touch sensor and a touch screen. In one embodiment, and as shown in FIG. 4, one or more of the haptic sensors $32_A$ is a touch sensor, which is an input device that suitably captures and records a single physical touch, such as a touch provided by the operator's finger 22. In other words, the touch sensor $32_A$ suitably captures and records a single finger touch. The touch sensor $32_A$ may respond similarly or differently to different types of touches, such as tapping, pressing, etc. The touch sensor $32_A$ may also respond similarly or differently to different pressures of touch. Typically, the touch sensor $32_A$ does not have a gesture recognition.

In another embodiment, and as shown in FIG. 5, one or more of the haptic sensors $32_B$ is a touch screen, which is any suitable display screen that enables the operator 22 to interact directly with the image(s) being displayed. Direct interaction may include touching the touch screen $32_B$ with the operator's finger, typically without the use of an intermediate device. In some instances, direct interaction may be accomplished using a stylus. In an embodiment, the touch screen $32_B$ has gesture recognition.

The aerial system 12 may also include additional sensors 33 for recording signals indicative of aerial device operation, the ambient environment surrounding the aerial device 12, and/or other parameters. The additional sensors 33 are typically mounted to the body 24, powered by the power supply 30, and controlled by the processing system 26. Non-limiting examples of additional sensors 33 include additional cameras, orientation sensors, accelerometers, gyroscopes, audio sensors, barometers, light sensors, temperature sensors, current sensors, air flow meters, voltmeters, touch sensors, proximity sensors, force sensors, vibration sensors, chemical sensors, sonar sensors, locations sensors, and/or the like.

Figure 6:
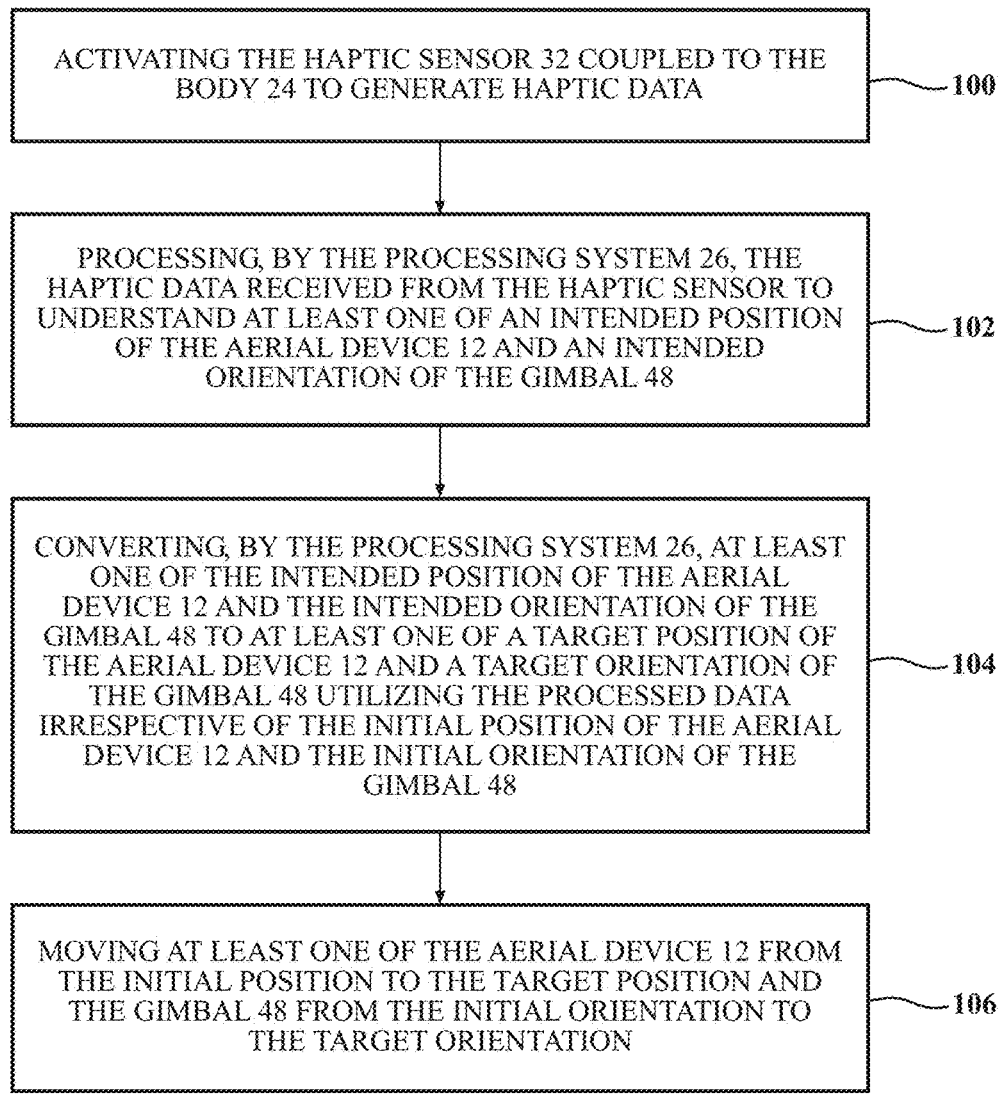
FIG. 6 is a flow diagram illustrating a method for controlling the aerial device.

Details of a method for controlling the aerial device 12 are described below. As shown in FIG. 6, the method comprises the steps of activating the haptic sensor 32 coupled to the body 24 to generate haptic data (method step 100); processing, by the processing system 26, the haptic data received from the haptic sensor to understand at least one of an intended position of the aerial device 12 and an intended orientation of the gimbal 48 (method step 102); converting, by the processing system 26, at least one of the intended position of the aerial device 12 and the intended orientation of the gimbal 48 to at least one of a target position of the aerial device 12 and a target orientation of the gimbal 48 utilizing the processed data irrespective of the initial position of the aerial device 12 and the initial orientation of the gimbal 48 (method step 104); and moving at least one of the aerial device 12 from the initial position to the target position and the gimbal 48 from the initial orientation to the target orientation (method step 106).

The method is typically performed while aerial device 12 is in operation. Prior to performing the method, the aerial device 12 has an initial position (longitudinal, lateral, and vertical) and the gimbal 48 has an initial orientation (pitch, roll, and yaw). The initial position may be any position of the aerial device 12 and the initial orientation may be any orientation of the gimbal 48 while the aerial device 12 is in operation (such as hovering at a specific location in the physical space) when the method begins.

Figure 7:
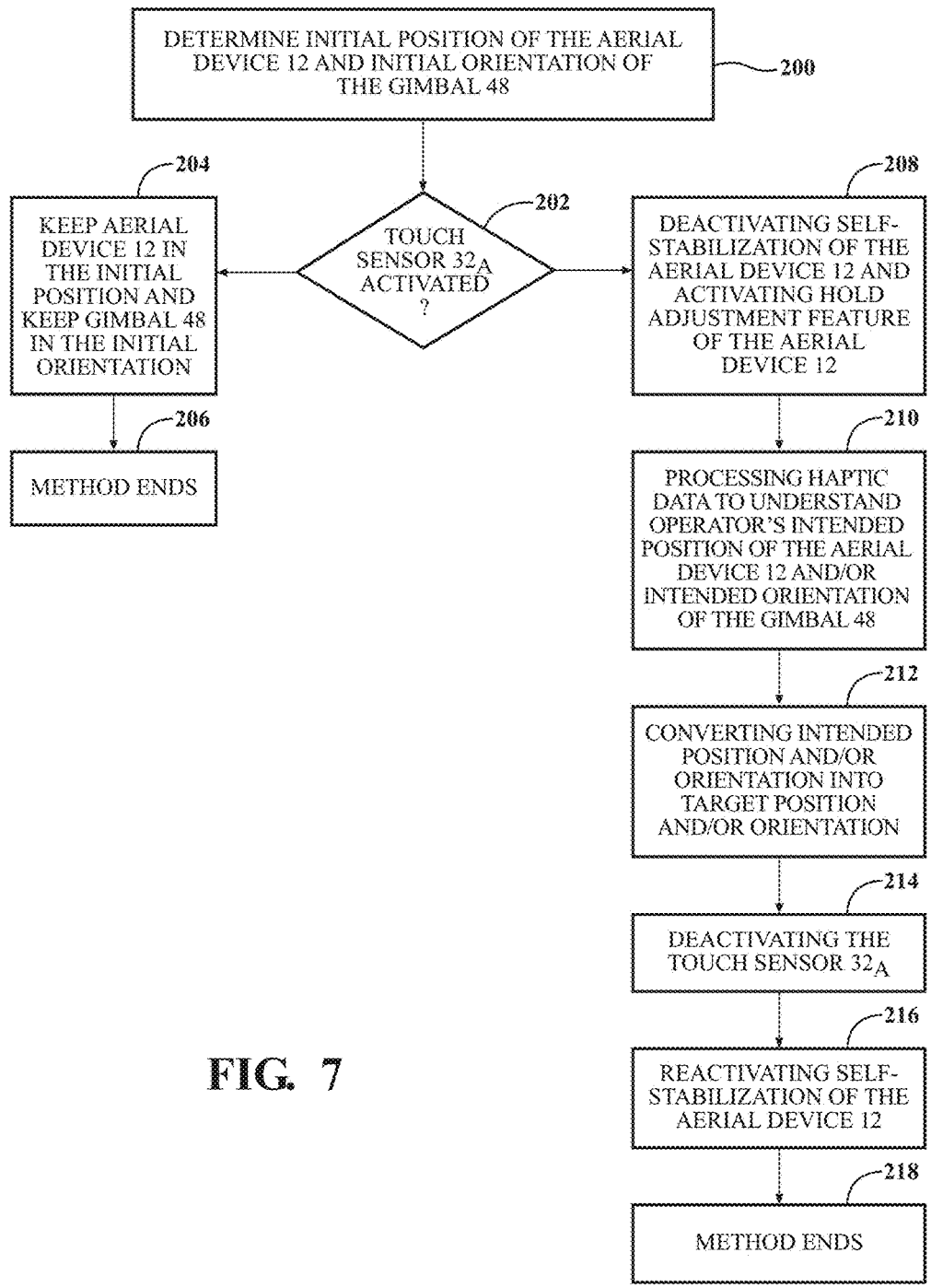
FIG. 7 is a flow diagram illustrating a method for controlling the aerial device and/or the gimbal including at least one touch sensor.

As previously mentioned, the aerial device 12 has at least one haptic sensor 32. In an embodiment, the haptic sensor(s) 32 is a touch sensor $32_A$. Details of the method utilizing the aerial device 12 having touch sensors $32_A$ are described below with reference to FIGS. 7-9. As shown in FIG. 7, the method includes determining the initial position of the aerial device 12 and the initial orientation of the gimbal 48 (method step 200). Once the initial position and initial orientation have been determined, the processing system 26 determines if the touch sensor $32_A$ has been activated (method step 202). Activating the touch sensor $32_A$ includes activating the touch sensor $32_A$ with a finger touch. In other words, the touch sensor $32_A$ may be activated by touching the touch sensor $32_A$ with the operator's finger. If the processing system 26 determines that the touch sensor $32_A$ has not been activated, then the processing system 26 controls the aerial 12 to keep the device 12 in its initial position and controls the gimbal 48 to keep the gimbal 48 in its initial orientation (method step 204) and the method ends (method step 206). If the processing system 26 determines that the touch sensor $32_A$ has been activated, then the method includes deactivating self-stabilization of the aerial device 12 and the gimbal 48 (method step 208). When self-stabilization is deactivated, the processing system 26 activates a hold adjustment feature to, for example, allow the operator 22 to grasp and hold the aerial device 12 in his/her hand(s) without reactive motion caused by self-stabilization of the device 12.

Figure 8:
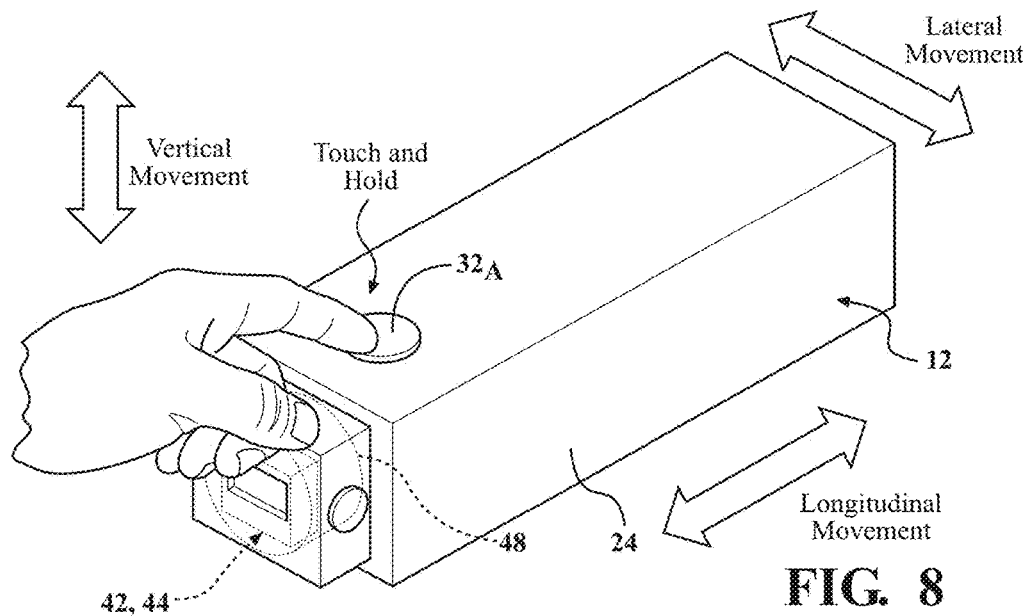
FIG. 8 is a schematic front perspective view of a portion of the aerial device illustrating a method for controlling a position of the aerial device utilizing touch sensor coupled to the body of the aerial device.

In embodiments where the haptic sensor 32 is the touch sensor $32_A$, the activating step includes activating the touch sensor $32_A$ with a single finger touch. The term single finger touch describes the act of placing the operator's finger on the touch sensor $32_A$ at one spot or location on the touch sensor $32_A$. With a single finger touch, the operator's finger remains in one spot and does not move around the surface of the sensor $32_A$. While maintaining the single finger touch on the touch sensor $32_A$, the operator 22 moves the aerial device 12 from the initial position to the target position and/or moves the gimbal 48 from the initial orientation to the target orientation. For example, while maintaining the single finger touch on the touch sensor $32_A$ mounted to the body 24 of the device 12, the operator 22 moves the aerial device 12 to any desired location (such as longitudinally, laterally, and/or vertically) within the physical space. This is shown in FIG. 8. Movement within the physical space typically occurs within the operator's reach. The location that the operator 22 moves the aerial device 12 to is the target position of the aerial device 12. During this movement, the touch sensor $32_A$ generates haptic data including geographic location data of the device 12 and transmits the haptic data (via the communication system 28) to the processing system 26. The processing system 26, utilizing one or more suitable software programs, processes the haptic data (geographic or coordinate location or position data) generated as the operator is moving the device 12 until the operator stops moving the device 12 to understand the operator's intended position of the device 12. The processing system 26 converts the intended position of the device 12 into the target position utilizing the processed data (method step 210 shown in FIG. 7).

Figure 9:
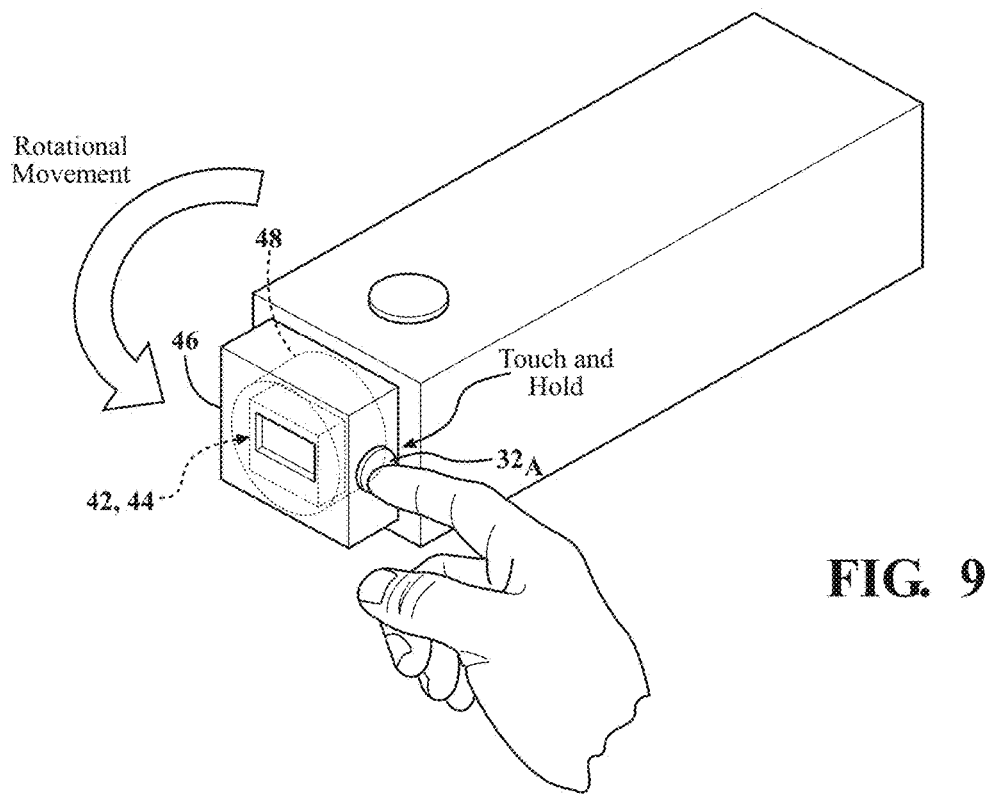
FIG. 9 is a schematic front perspective view of a portion of the aerial device illustrating a method for controlling an orientation of the gimbal utilizing a touch sensor mounted to a housing for supporting an optical system of the aerial device.

In another example, while maintaining the single finger touch on the touch sensor $32_A$ mounted to the housing 46 supporting the optical system 42, the operator 22 rotates the housing 46 to any desired rotational position. This is shown in FIG. 9. Since the gimbal 48 is mounted to the housing 46, the gimbal 48 rotates with the rotational movement of the housing 46. During rotation of the gimbal 48, the touch sensor $32_A$ mounted to the housing 46 generates haptic data including orientation data of the gimbal 48 and transmits the haptic data (via the communication system 28) to the processing system 26. The processing system 26, utilizing one or more suitable software programs, processes the haptic data generated as the operator is rotating the housing 46 until the operator stops rotating the housing 46 to understand the operator's intended orientation of the gimbal 48 (method step 210 in FIG. 7). The processing system 26 converts the intended orientation of the gimbal 48 into the target orientation utilizing the processed data (method step 212 shown in FIG. 7).

It is to be understood that the processing system 26 converts the intended position into the target position of the aerial device 12 and the intended orientation to the target orientation of the gimbal 48 irrespective of the initial position and initial orientation. In this way, the processing system 26 can determine the target position of the device 12 and the target orientation of the gimbal 48 without requiring any initial position and initial orientation data.

Referring back to FIG. 7, the method further includes the step of deactivating the touch sensor $32_A$ by removing the single finger touch from the touch sensor $32_A$ after the moving step (method step 214). For example, once the aerial device 12 has been moved to the target position and/or the gimbal 48 has been rotated to the target orientation, the operator 22 removes his/her finger from the touch sensor $32_A$. Upon removing the operator's finger from the touch sensor $32_A$, the device 12 remains at the target position and/or target orientation. Also upon removing the operator's finger from the touch sensor $32_A$, the method includes reactivating self-stabilization of the device 12 to enable the operator 22 to remove his/her grasp on and let go of the device 12. The aerial device 12 then automatically hovers within the physical space at the target position and the gimbal 48 orientated at the target orientation (method step 216). The method ends at step 218.

Figure 10:
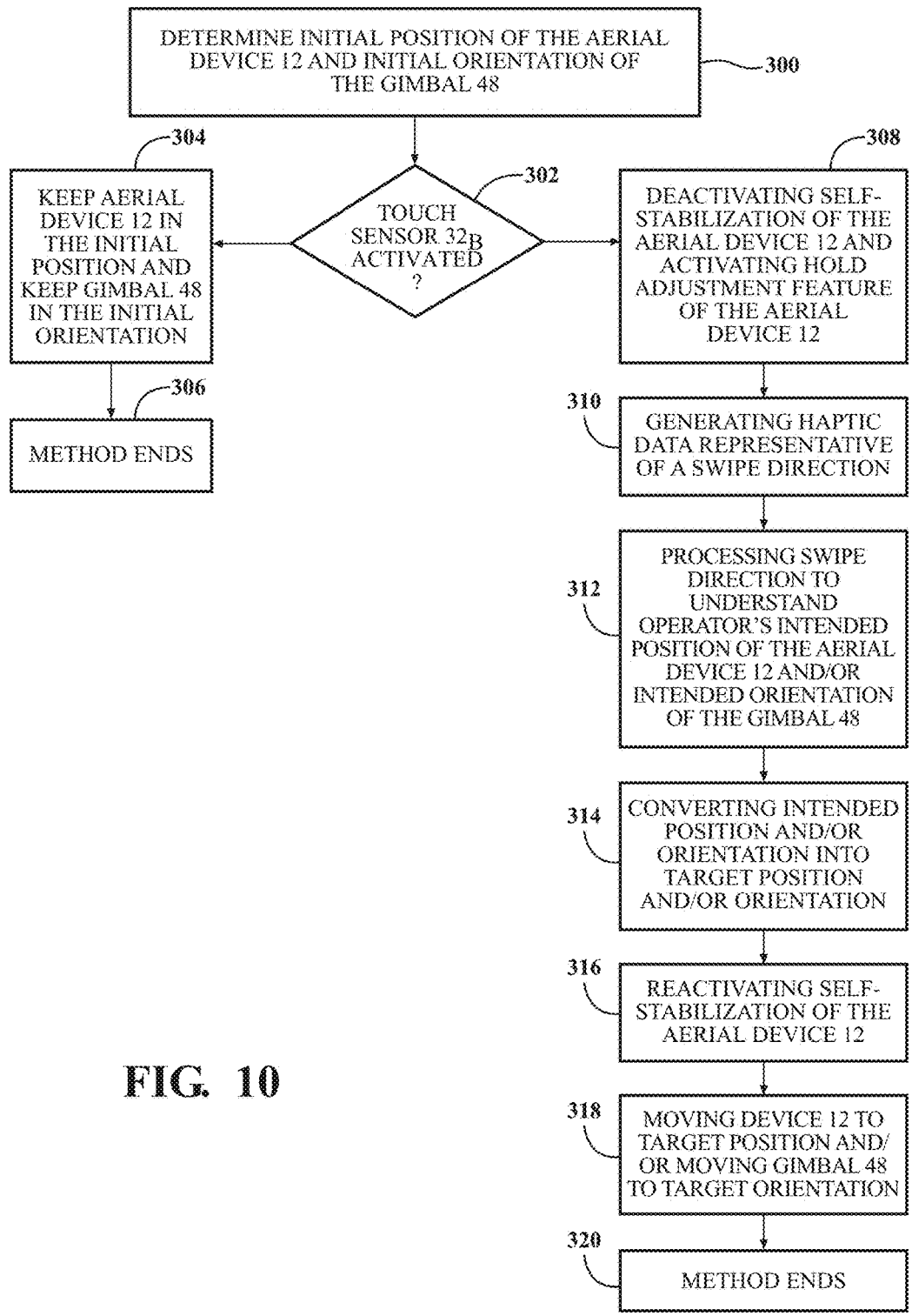
FIG. 10 is a flow diagram illustrating a method for controlling a position of the aerial device utilizing a touch screen coupled to the body of the aerial device.
Figure 11:
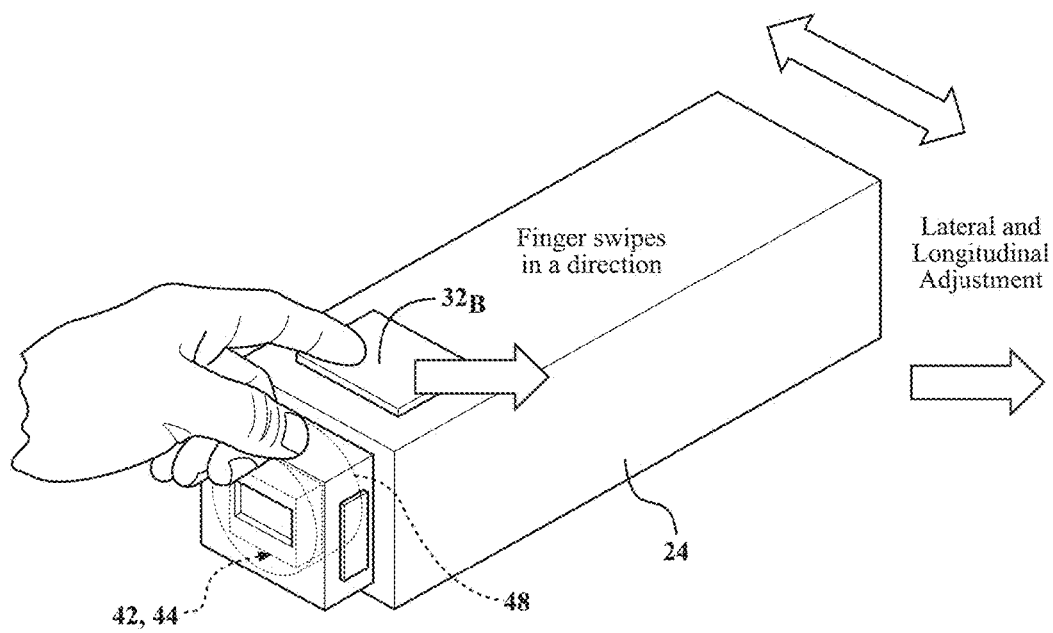
FIG. 11 is a schematic front perspective view of a portion of the aerial device illustrating a method for controlling lateral and longitudinal position of the aerial device utilizing the touch screen mounted to the body of the aerial device.
Figure 12:
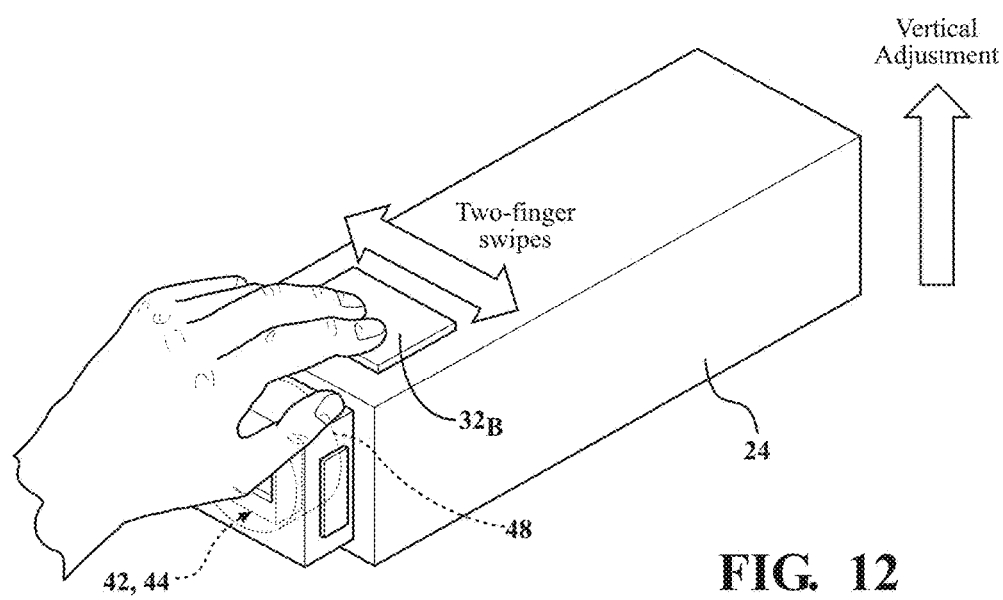
FIG. 12 is a schematic front perspective view of a portion of the aerial device illustrating a method for controlling a vertical position of the aerial device utilizing the touch screen mounted to the body of the aerial device.

In another embodiment, the haptic sensor(s) 32 coupled to the body 24 of the aerial device 12 is a touch screen $32_B$. Details of the method utilizing the aerial device 12 having touch screens $32_B$ are described below with reference to FIGS. 10-13. As shown in FIG. 10, the method includes determining the initial position of the aerial device 12 and the initial orientation of the gimbal 48 (method step 300). Once the initial position and the initial orientation have been determined, the processing system 26 determines if the touch screen $32_B$ has been activated (method step 302). Activating the touch screen $32_B$ includes activating the touch screen $32_B$ with a finger swipe. In other words, the touch screen $32_B$ may be activated by a finger swipe on the touch screen $32_B$ with the operator's finger. If the processing system 26 determines that the touch screen $32_B$ has not been activated, then the processing system 26 controls the aerial device 12 to keep the device 12 in its initial position and controls the gimbal 48 to keep the gimbal 48 in its initial orientation (method step 304) and the method ends (method step 306). If the processing system 26 determines that the touch screen $32_B$ has been activated, then the method includes deactivating self-stabilization of the aerial device 12 and the gimbal 48 (method step 308). When self-stabilization is deactivated, the processing system 26 activates a hold adjustment feature to, for example, allow the operator 22 to grasp and hold the aerial device 12 in his/her hand(s) without reactive motion caused by self-stabilization of the device 12.

In embodiments where the haptic sensor 32 is the touch screen $32_B$, the activating step includes activating the touch screen $32_B$ with the finger swipe. The term finger swipe describes the act of dragging or swiping at least one of the operator's fingers on, along, and/or across the touch screen $32_B$ in a predetermined swipe path and/or swipe direction. With a finger swipe, the operator's finger(s) touches the touch screen $32_B$ in multiple locations. In other words, the finger swipe is a plurality of finger touches on the touch screen $32_B$ including an initial touch followed by multiple touches at different locations on the touch screen $32_B$. The plurality of touches typically specify a swipe path and/or swipe direction.

The method includes generating haptic data, by the touch screen $32_B$, representative of the swipe direction (method step 310 shown in FIG. 10). In the embodiment shown in FIG. 11, lateral and/or longitudinal adjustment or control of the aerial device 12 may be accomplished utilizing haptic data generated from a finger swipe in a swipe direction from just one of the operator's fingers. In the embodiment shown in FIG. 12, vertical adjustment or control of the aerial device 12 may be accomplished utilizing haptic data generated from a finger swipe in a swipe direction from two of the operator's fingers at the same time. This is essentially two finger swipes generated simultaneously.

The touch screen $32_B$ transmits (via the communications system 28) the haptic data to the processing system 26. The processing system 26 processes the data to understand the operator's intended position of the aerial device 12 (method step 312). In an embodiment, utilizing one or more suitable software programs, the processing system 26 translates the swipe direction into a position difference in position coordinates. In this embodiment, the position difference is typically proportional to the length of the finger swipe across the touch screen $32_B$. In another embodiment, utilizing one or more suitable software programs, the processing system 26 translates the swipe direction into a short swipe (where the swipe distance is shorter than a preset threshold distance) as a short movement command, and a long swipe (where the swipe distance is longer than a preset threshold distance) as a long movement command. The processing system 26 converts the intended position into the target position of the device 12 (method step 314). For example, the processing 26 converts the position difference determined from the swipe direction into a local coordinate using the initial position of the aerial device 12 and a classic coordinate calculation or transformation software program. The processing system 26 adds the coordinate of the position difference to the coordinate of the initial position of the aerial device 12 to convert the intended position into the target position of the device 12.

Figure 13:
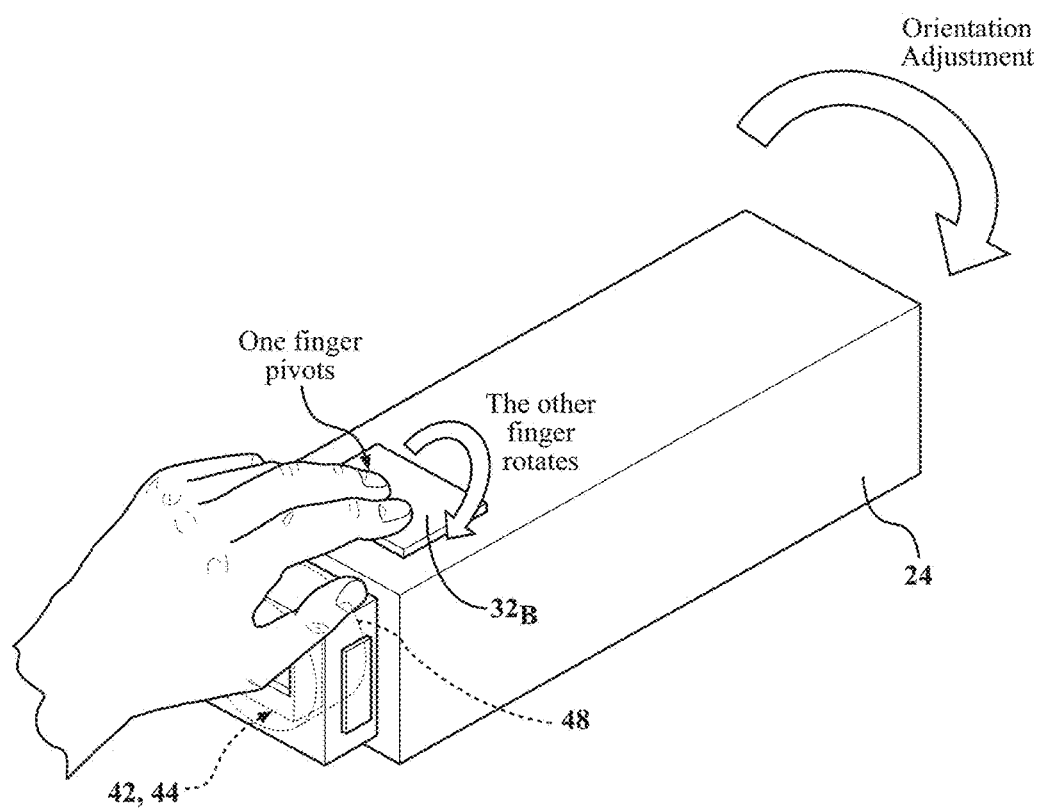
FIG. 13 is a schematic front perspective view of a portion of the aerial device illustrating a method for controlling an orientation of the gimbal utilizing the touch screen mounted to a housing for supporting an optical system of the aerial device.

The orientation of the gimbal 48 may be controlled utilizing haptic data representative of a swipe direction generated by two of the operator's fingers, with one finger pivoting on the touch screen $32_B$ while the other finger rotates on the touch screen $32_B$. This is shown in FIG. 13. The method of controlling the orientation of the gimbal 48 is accomplished similarly to the method of controlling the position of the device 12 described above. For example, with the aerial device 12 hovering at the initial position and initial orientation, the operator 22 grasps the device 12 and activates the touch screen $32_B$ by touching the touch screen $32_B$ with the finger swipe described above. The touch screen $32_B$ transmits (via the communications system 28) the haptic data to the processing system 26. The processing system 26 processes the data to understand the operator's intended orientation of the gimbal 48. In an embodiment, utilizing one or more suitable software programs, the processing system 26 translates the swipe direction into an orientation difference in gimbal coordinates. In this embodiment, the orientation difference is typically proportional to the length of the finger swipe across the touch screen $32_B$. In another embodiment, utilizing one or more suitable software programs, the processing system 26 translates the swipe direction into a short swipe (where the swipe distance is shorter than a preset threshold distance) as a short gimbal rotation command, and a long swipe (where the swipe distance is longer than a preset threshold distance) as a long gimbal rotation command. The processing system 26 converts the intended orientation into the target orientation of the gimbal 48. For example, the processing 26 converts the orientation difference into a local coordinate using the initial orientation of the gimbal 48 and a classic coordinate transformation software program. The processing system 26 adds the coordinate of the orientation difference to the coordinate of the initial orientation of the gimbal 48 to determine the target orientation of the gimbal 48 (method step 314).

In another embodiment, utilizing gimbal angular sensors (such as hall effect sensors, magnetic encoders, rotary potentiometers, etc.), the orientation of the gimbal 48 may be controlled by directly rotating the gimbal 48 by the operator to a desired angular position, and holding the gimbal 48 at the new angular position for a period of time. The processing system 26, utilizing suitable software program(s), understands the new position of the gimbal 48 and sets this position as a new control set point.

Once the processing system 26 determines the target position and/or orientation, the method includes reactivating the self-stabilizing feature of the device 12 (method step 316) and activates the lift mechanism 36 to effect movement of the device 12 to move the device 12 to the target position and/or the gimbal 48 to move the gimbal 48 to the target orientation (method step 318). The aerial device 12 automatically hovers within the physical space at the target position and/or with the target orientation of the gimbal 48 and the method ends (method step 320).

As mentioned above, and in the illustrated embodiments, the aerial device 12 has two haptic sensors 32 with one mounted to the body 24 and the other mounted to the housing 46. The position and orientation may be controlled independently, such as by activating the haptic sensor 32 mounted to the body 24 for controlling the position of the device 12 or by activating the haptic sensor 32 mounted to the housing 46 for controlling the orientation of the gimbal 48. In another embodiment, both of the haptic sensors 32 may be activated to control both the position and the orientation. For example, the operator 22 can activate the haptic sensor 32 mounted to the body 24 to control the position of the device 12 and the haptic sensor 32 mounted to the housing 46 to control the orientation of the gimbal 48 sequentially or substantially simultaneously.

In addition, the embodiments of the device 12 have been described above as having two touch sensors $32_A$ or two touch screens $32_B$. In an alternative embodiment, the device 12 could have one touch sensor $32_A$ and one touch screen $32_B$. In this alternative embodiment, the operator 22 can control the position (or orientation) by activating the touch sensor $32_A$ and moving the body 24 (or gimbal 48) and can control the orientation (or position) by activating the touch screen $32_B$. Other arrangements or combinations of haptic sensors 32 are also contemplated herein.

The embodiments of the aerial device 12 is button-free and advantageously allows an operator to easily and effectively control the aerial device 12 and/or the gimbal 48 without having to actuate multiple buttons on the remote device 14 at substantially the same time. Use of the haptic sensors 32 allows the operator to control the device 12 without having to worry about how the device 12 is currently positions/orientated, as actuation of the haptic sensor does not change or reverse based on the initial or current position of the device 12.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An aerial device comprising:
   a body;
   a lift mechanism coupled to said body and configured to provide at least one of lift and thrust to said body;
   an optical system coupled to said body and having a camera;
   a gimbal supporting said camera and enabling rotational movement of said camera;
   a haptic sensor coupled to said body and configured to generate haptic data; and
   a processing system disposed in said body and in data communication with said haptic sensor with said processing system configured to:
      process said haptic data received from the haptic sensor to understand at least one of an intended position of said aerial device and an intended orientation of said gimbal; and
      convert said at least one of said intended position of said aerial device and said intended orientation of said gimbal to at least one of a target position of the aerial device and a target orientation of the gimbal utilizing said processed data irrespective of an initial position of said aerial device and an initial orientation of said gimbal.

2. The aerial device as set forth in claim 1 further comprising at least one of an accelerometer and a gyroscope for stabilizing said aerial device and said processing system is further configured to deactivate self-stabilization of said aerial device upon processing said haptic data received from said haptic sensor.

3. The aerial device as set forth in claim 1 wherein said aerial device has a control interface disposed on said body with said control interface being free of at least one actuation button.

4. The aerial device as set forth in claim 1 wherein said haptic sensor is selected from a touch sensor and a touch screen.

5. The aerial device as set forth in claim 1 wherein said haptic sensor is mounted to said body and said processing system is further configured to determine said target position of said aerial device utilizing said haptic data generated by said haptic sensor.

6. The aerial device as set forth in claim 1 further comprising a housing coupled to said body and said optical system is disposed within said housing with said haptic sensor mounted to said housing, and said processing system is further configured to determine said target orientation of said gimbal utilizing said haptic data generated by said haptic sensor.

7. The aerial device as set forth in claim 1 wherein said haptic sensor is further defined as a first haptic sensor coupled to said body and configured to generate first haptic data and further comprising a second haptic sensor coupled to said body and configured to generate second haptic data and said processing system is further configured to determine the target position utilizing the first haptic data and the target orientation utilizing the second haptic data.

8. The aerial device as set forth in claim 7 wherein each of the first and second haptic sensors is selected from a touch sensor and a touch screen.

9. A method for controlling an aerial device having a body, an optical system coupled to the body and having a camera, a gimbal supporting the camera, a haptic sensor coupled to the body, and a processing system disposed in the body and in data communication with the haptic sensor with the aerial device having an initial position and an initial orientation, with the aerial device having an initial position and the gimbal having an initial orientation, and said method comprising the steps of:

activating the haptic sensor coupled to the body to generate haptic data;

processing, by the processing system, the haptic data received from the haptic sensor to understand at least one of an intended position of the aerial device and an intended orientation of the gimbal;

converting, by the processing system, the at least one of the intended position of the aerial device and the intended orientation of the gimbal to at least one of a target position of the aerial device and a target orientation of the gimbal utilizing the processed data irrespective of the initial position of the aerial device and the initial orientation of the gimbal; and moving at least one of the aerial device from the initial position to the target position and the gimbal from the initial orientation to the target orientation.

10. The method as set forth in claim 9 wherein the aerial device further has at least one of an accelerometer and a gyroscope and further comprising the step of deactivating self-stabilization of the aerial device upon processing the haptic data received from the haptic sensor.

11. The method as set forth in claim 9 wherein the step of activating the haptic sensor includes activating the haptic sensor with a finger touch.

12. The method as set forth in claim 9 wherein the haptic sensor is a touch sensor, the activating step includes activating the touch sensor with a single finger touch, and further comprising maintaining the single finger touch on the touch sensor during the step of moving at least one of the aerial device from the initial position to the target position and the gimbal from the initial orientation to the target orientation.

13. The method as set forth in claim 12 further comprising the step of deactivating the touch sensor by removing the single finger touch from the touch sensor after the moving step.

14. The method as set forth in claim 9 wherein the haptic sensor is a touch sensor mounted to the body of the aerial device and the converting step is further defined as converting the intended position to the target position of the aerial device utilizing the processed data.

15. The method as set forth in claim 9 wherein the aerial device further has a housing coupled to the body and the optical system disposed in the housing, and the haptic sensor is a touch sensor mounted to the housing and the converting step is further defined as converting, by the processing system, the intended orientation to the target orientation of the gimbal utilizing the processed data.

16. The method as set forth in claim 15 further comprising rotating the gimbal to effect movement of the aerial device to the target orientation.

17. The method as set forth in claim 9 wherein the haptic sensor is further defined as a first haptic sensor coupled to the body and the aerial device further has a second haptic sensor coupled to the body and further comprising the steps of:

activating the first and second haptic sensors by touching each of the first and second haptic sensors with a single finger touch; and moving at least one of the aerial device to the target position and the gimbal to the target orientation while maintaining the touching of the first and second haptic sensors.

18. The method as set forth in claim 9 wherein the haptic sensor is a touch screen mounted to the body and the activating step includes activating the touch screen with a finger swipe, and further comprising the step of generating, by the touch screen, haptic data representative of a swipe direction.

19. The method as set forth in claim 9 wherein the aerial device further has a housing coupled to the body and the optical system disposed within the body, and the haptic sensor is a touch screen mounted to the housing and the converting step is further defined as converting, via the processing system, the intended orientation to the target orientation of the gimbal utilizing the processed data.

20. The method as set forth in claim 19 wherein the haptic sensor is a touch screen mounted to the housing and the activating step includes activating the touch screen with a finger swipe, and further comprising the step of generating, by the touch screen, haptic data representative of a swipe direction.

* * * * *